United States Patent [19]
Bienert

[11] 3,960,404
[45] June 1, 1976

[54] SLIDING ROOF STRUCTURE WITH TWO-WAY OPENABLE ROOF PANEL

[75] Inventor: Horst Bienert, Gauting, Germany

[73] Assignee: Webasto-Werk W. Baier KG, Munich, Germany

[22] Filed: July 22, 1975

[21] Appl. No.: 598,077

[30] Foreign Application Priority Data
July 24, 1974  Germany.............................. 2435551

[52] U.S. Cl............................................. 296/137 F
[51] Int. Cl.² ......................................... B60J 7/04
[58] Field of Search......... 296/137 F, 137 E, 137 G, 296/137 H, 137 B

[56] References Cited
UNITED STATES PATENTS

| | | | |
|---|---|---|---|
| 3,829,155 | 8/1974 | Lutz ................................ | 296/137 F |
| 3,863,979 | 2/1975 | Bienert ........................... | 296/137 G |
| 3,894,767 | 7/1975 | Schatzler........................ | 296/137 F |
| 3,913,970 | 10/1975 | Jardin.............................. | 296/137 F |
| R28,346 | 2/1975 | Kouth.............................. | 296/137 F |

*Primary Examiner*—Robert R. Song
*Attorney, Agent, or Firm*—Otto John Munz

[57] ABSTRACT

A sliding roof structure for automobiles where the sliding roof panel is openable upwardly in a venting mode and retractable in a retracting mode and where an inner opening, defined by a recessed roof frame is surrounded by a fixed canopy, while a first movable canopy portion, or panel canopy, is connected to the sliding roof panel and another movable canopy portion is connected to a transversely extending movable rain channel underneath the rear edge of the outer roof opening. The movable rain channel is operatively connected to the panel canopy, supporting the rear edge of the latter, when it is not lifted in the venting mode.

7 Claims, 3 Drawing Figures

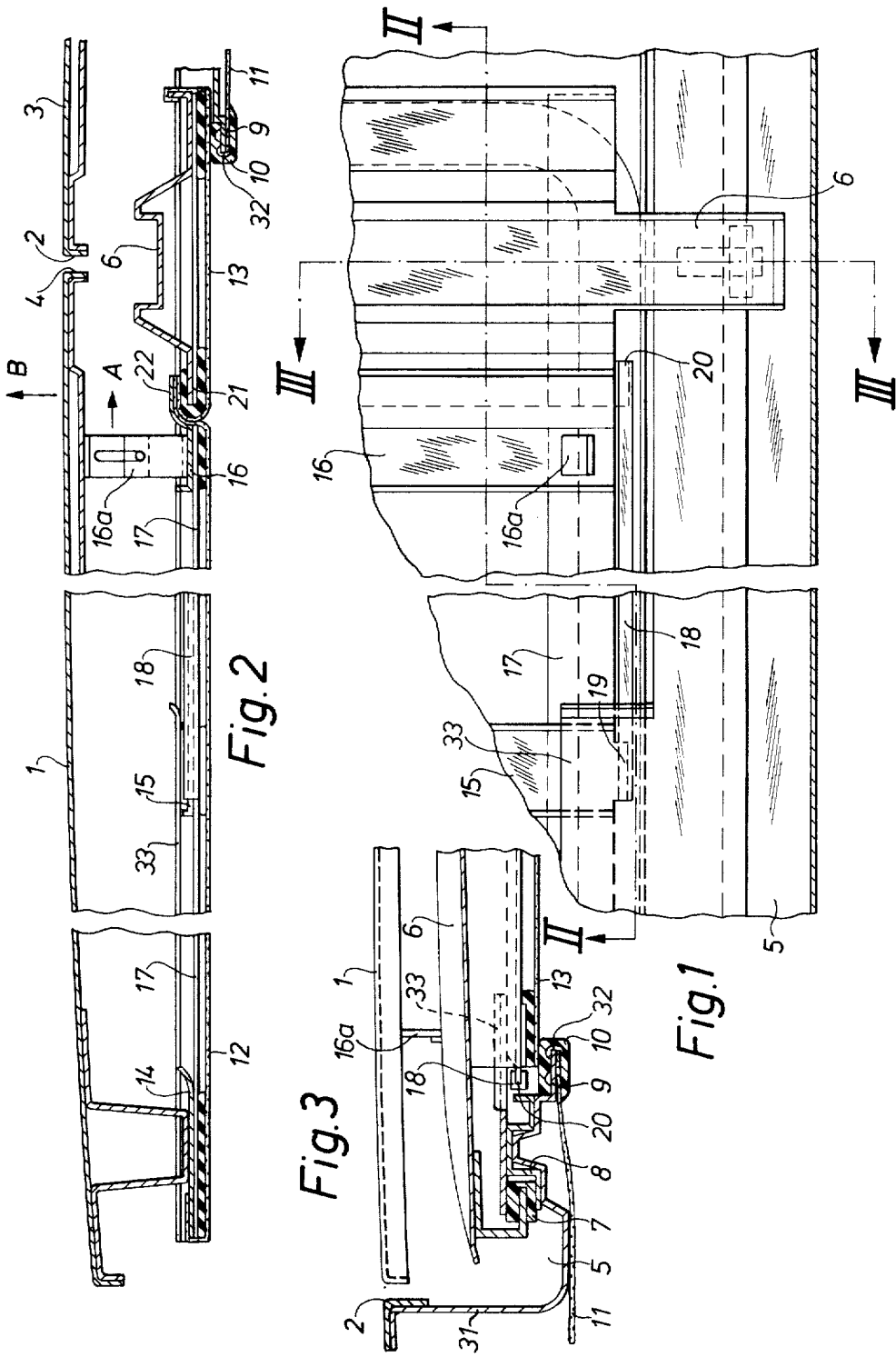

SLIDING ROOF STRUCTURE WITH TWO-WAY OPENABLE ROOF PANEL

BACKGROUND OF THE INVENTION

1. Field of the Invention

The present invention relates to sliding roof structures for automobiles, and more particularly to sliding roof structures where the sliding roof panel is openable in two opening modes, either by pivoting the panel upwardly out of the roof opening into a venting position, or by pivoting the panel downwardly and then retracting it under the stationary roof structure, in the manner of a retractable sliding roof. Specifically, the present invention relates to canopy covers for this type of automobile sliding roof structure.

2. Description of the Prior Art

Retractable sliding roof structures for automobiles are generally so designed that the rectangular roof opening is surrounded on its front and lateral edges by a stationary rain channel, while the rain channel portion underneath the rear edge is made longitudinally mobile, to be retracted underneath the stationary roof portion with the movable roof panel. The latter carries an interior cover panel or canopy, which, in the closed panel position, is aligned with the inner lining or stationary canopy of the surrounding stationary roof structure. Whereas in the case of a simple retractable roof panel, the panel canopy does not execute a pivoting motion and can, therefore, extend rearwardly beyond the movable rain channel portion, this is no longer possible with the two-way openable sliding roof structure, where it is necessary for the panel canopy to execute an upwardly pivoting motion with the pivotable roof panel.

The prior art, therefore, suggests a solution in which the rear edge of the canopy panel terminates short of the movable rain channel, with the consequent disadvantage that the cooperating rear transverse edge of the stationary canopy is positioned a distance forward of the outer roof opening, thereby reducing the effective length of the inner roof opening in the upwardly pivoting opening mode as well as in the retracting opening mode, when the roof panel is fully retracted. Such a prior art sliding roof structure is disclosed in U.S. Pat. No. 3,894,767.

SUMMARY OF THE INVENTION

Underlying the present invention is the primary objective of suggesting an improved canopy configuration for two-way openable sliding roof structures of the above-mentioned type, where the earlier-mentioned shortcomings are eliminated by arranging the movable and stationary portions of the roof canopy in such a way that the entire roof opening is exposed, when the sliding roof is opened in the retracting opening mode.

The present invention proposes to attain this objective by suggesting a sliding roof structure in which the movable rain channel is so arranged that its lower side carries a portion of the movable canopy which, as the rain channel is retracted together with the sliding roof panel, exposes an additional portion of the inner roof opening.

In a preferred embodiment, the invention suggests that the movable rain channel include a forwardly extending ledge supporting thereon an upwardly offset rear edge of the panel canopy, when the latter is in its closed position. The panel canopy itself is preferably supported on a canopy frame consisting of a forward transverse frame member attached to the rigid sliding roof panel, a pair of flexible lateral frame members, a rear transverse frame member defining said offset rear edge of the panel canopy and connected laterally to the rear portion of the sliding roof panel, and an intermediate transverse frame member which is laterally guided in the roof guides and longitudinally linked to the movable rain channel by means of lateral connecting rods.

BRIEF DESCRIPTION OF THE DRAWING

Further special features and advantages of the invention will become apparent from the description following below, when taken together with the accompanying drawing which illustrates, by way of example, a preferred embodiment of the invention, represented in the various figures as follows:

FIG. 1 shows, as seen from above, a portion of the left-hand side of a sliding roof structure embodying the invention, the sliding roof panel having been removed;

FIG. 2 shows an elevational longitudinal cross section along line II—II of FIG. 1; and FIG. 3 shows a transverse cross section along line III—III of FIG. 1.

DESCRIPTION OF THE PREFERRED EMBODIMENT

Referring to the drawing, there is illustrated a two-way openable sliding roof structure for automobiles comprising, as constituent parts thereof, a rigid pivotable sliding roof panel 1, shown in its closed position in alignment with a generally rectangular outer roof opening 2 in the stationary roof structure 3. A roof frame attached to the stationary roof structure 3 surrounds its opening 2, forming a downwardly recessed rain channel 5 along its front and lateral edges. The lateral portions of the rain channel 5 carry horizontal roof guides 8 in the form of generally U-shaped outwardly facing guide profiles.

The forward portion of the sliding roof panel 1 is laterally guided in the roof guides 8, by means of guide shoes (not shown), the panel 1 being upwardly and downwardly pivotable about these guide shoes. Accordingly, an upward pivoting motion on the rear edge of the panel 1 along arrow B brings the panel 1 into an upwardly pivoted venting position, whereas a short downward pivoting motion of its rear edge allows retraction of the panel 1 in the direction of arrow A, under the outer panel of the stationary roof structure 3. A movable transverse rain channel 6 is arranged underneath the rear edge of the outer roof opening 2, the extremities of the channel 6 reaching partially over the lateral rain channel portions 5 (FIG. 3), discharging any water received into the lateral rain channels. The movable rain channel 6 engages the roof guide 8 with suitable guide shoes 7, carried by bracket extensions attached to the channel profile. Thus, while the movable rain channel 6 remains in place, when the roof panel 1 is opened in the venting mode, along arrow B, it is designed to move with the roof panel 1 in the retracting mode, along arrow A. The pivoting motions of the roof panel 1 as well as its retracting motion are obtained by means of a suitable sliding roof operating mechanism (not shown) which may include a cross member behind the movable rain channel 6 and suitable lifting linkages connecting the lateral extremities of the cross member to the rear portion of the rigid roof panel 1. Such a sliding roof operating mechanism is disclosed, for example, in U.S. Pat. No. 3,829,155, or alternatively, in German Pat. No. 2,016,492.

While the roof panel 1 cooperates with and matches the contour of the outer roof opening 2, an inner roof opening 32 is defined by the roof frame 31 which surrounds the roof opening. The lateral edges of this inner roof opening are shown in FIG. 3, and its rear edge is shown in FIG. 2. A rubber profile 10 is attached to the roof frame edge 9 which defines the inner roof opening. This rubber profile 10 also holds in place the identically contoured edge of a stationary canopy 11, forming part of the stationary roof structure 3. With the sliding roof panel 1 in its closed position as shown in FIG. 2, the inner opening, or canopy opening 32 is covered by a removable canopy consisting of two separate parts: The major portion of the removable canopy is formed by a panel canopy 12 which is connected to the sliding roof panel 1, while a smaller, rearwardly adjacent canopy portion 13 is attached to the movable rain channel 6. The panel canopy 12 is carried by a canopy frame consisting of three transversely extending canopy frame members 14, 15, and 16, and two spaced longitudinally extending lateral canopy frame members 17. The forward transverse member 14 is attached to the forward portion of the roof panel 1, and to it are attached the lateral members 17. These lateral members possess a certain vertical flexibility, while being capable of transmitting longitudinal movement forces. The intermediate transverse member 15, attached to the lateral members 17, engages with its extremities lateral guides 33 associated with the roof guides 8. Lastly, the rear transverse member 16 is connected to the rear portion of the sliding roof panel 1, or to the lifting linkages of the roof opening mechanism, in a manner not shown, thereby following the upward pivoting motion (arrow B) of the roof panel 1 and lifting the rear portion of the panel canopy 12 accordingly. The flexible lateral members 17 of the canopy frame then act as flexural hinges at their connection with the intermediate transverse member 15. Two rods 18 connect the lateral extremities of this intermediate transverse member 15 to the movable channel 6, so that the rain channel 6 will execute the same retracting motion (arrow A) as the roof panel 1, without also executing its pivoting motions. The connecting rods 18 are preferably of plastic material and so designed that they can be snapped onto lateral noses 19 and 20 at the extremities of the two transverse members.

The movable rain channel 6 has a forwardly extending ledge 21 to which is attached one edge of the rear canopy portion 13. This ledge 21 also carries the rear transverse member of the panel canopy frame, the latter having a matching upwardly offset edge portion 22 for this purpose. The panel canopy 12 and the rear canopy portion 13 are thus horizontally aligned in the closed position of the roof panel 1. In the retracting opening mode of the roof structure, both movable canopy members move in unison and in alignment with each other, thereby exposing a rearwardly enlarged canopy opening 32, when the roof panel 1 is fully retracted. The connecting rods 18, linking the movable rain channel 6 to the intermediate transverse member 15 of the panel canopy frame, are readily removable for convenient disassembly. They also form a rattle-free, inexpensive operative connection between the rain channel 6 and the movable roof panel 1, through the intermediate of the lateral members 17 and the transverse intermediate member 15 of the canopy frame.

It should be understood, of course, that the foregoing disclosure describes only a preferred embodiment of the invention and that it is intended to cover all changes and modifications of this example of the invention which fall within the scope of the appended claims.

I claim the following:

1. A sliding roof structure for automobiles, having a generally rectangular sliding roof panel which is movable out of a matching outer roof opening in two modes, by pivoting the rear portion of the panel upwardly out of the outer opening in a venting mode, and by pivoting it downwardly and thereupon retracting the panel along lateral roof guides under the rearwardly adjacent stationary roof panel in a retracting mode, and where a downwardly offset roof frame surrounds the outer roof opening, defining at least three sides of a generally rectangular inner roof opening, and a roof canopy covers the inner roof area at the level of the inner roof opening, within and around said inner roof opening, the improvement comprising:

a transversely extending movable rain channel in operative connection with the sliding roof panel and guided for horizontal motion therewith, said rain channel being positioned vertically between the levels of the inner and outer roof openings, its normal horizontal position being underneath the rear edge of the outer roof opening, except when the sliding roof panel is opened in the retracting mode; and a movable canopy portion covering, as part of said roof canopy, the area located within the inner roof opening when the sliding roof panel is in its closed position; said movable canopy portion including a panel canopy connected to the sliding roof panel, an a separate rear canopy portion connected to the movable rain channel.

2. A sliding roof structure as defined in claim 1, wherein the roof frame defines all four sides of the inner roof opening; the rear portion of the frame being spaced downwardly from the outer roof opening to accommodate the movable rain channel and the retracted sliding roof panel therebetween, and the rear edge of the inner roof opening being spaced a distance behind the rear edge of the outer roof opening; and the movable rain channel and its rear canopy portion form a short overlap with the rear edge of the inner opening, in the normal rain channel position, said rear canopy portion being located just above said edge of the inner opening.

3. A sliding roof structure as defined in claim 1, wherein the panel canopy includes and is supported by a canopy frame comprising, as parts thereof: a forward transverse member attached to the forward portion of the sliding roof panel; two spaced lateral members, likewise connected to the forward portion of the sliding roof panel, and arranged to execute an upward pivoting motion, when the sliding roof panel is pivoted in the venting mode; and a rear transverse member connecting the rear portion of the lateral members; and the rear portion of the canopy frame is operatively connected to the rear portion of the sliding roof panel, to be lifted when the latter is pivoted upwardly in the venting mode.

4. A sliding roof structure as defined in claim 3, wherein
the lateral members of the panel canopy frame are vertically flexing, so as to form flexural pivots for said upward pivoting motion, when the rear portion of the canopy frame is lifted.

5. A sliding roof structure as defined in claim 3, wherein
the operative connection between the movable rain channel and the sliding roof panel includes the canopy frame of the panel canopy as a motion transmitting means.

6. A sliding roof structure as defined in claim 5, wherein
the canopy frame of the panel canopy further comprises an intermediate transverse member, located between said forward and rear transverse members and connected to the lateral members of the frame, while being vertically restrained by the lateral roof guides in the venting mode of the sliding roof panel; and
the operative connection between the movable rain channel and the sliding roof panel includes rigid connecting means extending between the movable rain channel and the intermediate transverse member of the panel canopy frame, for transmitting horizontal motions of the sliding roof panel to the movable rain channel.

7. A sliding roof structure as defined in claim 6, wherein
said connecting means includes connecting noses on the lateral extremities of the intermediate transverse canopy frame member and of the movable rain channel, respectively, and lateral connecting rods engaging these noses.

* * * * *